(12) United States Patent
Franck

(10) Patent No.: US 6,266,259 B1
(45) Date of Patent: Jul. 24, 2001

(54) HALF-BRIDGE INVERTER

(75) Inventor: Felix Franck, München (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/635,209

(22) Filed: Aug. 9, 2000

(30) Foreign Application Priority Data

Apr. 11, 1999 (DE) ................................................ 199 37 925

(51) Int. Cl.[7] .................................................. H02M 7/5387
(52) U.S. Cl. ................................................ 363/132; 363/98
(58) Field of Search ................................. 363/17, 95, 97, 363/98, 131, 132

(56) References Cited

U.S. PATENT DOCUMENTS

| | | | |
|---|---|---|---|
| 4,914,558 | * | 4/1990 | Flickinger ................................ 363/17 |
| 5,303,140 | * | 4/1994 | Shimizu ................................ 363/132 |
| 5,875,103 | * | 2/1999 | Bhagwat et al. ........................ 363/17 |

FOREIGN PATENT DOCUMENTS 197 22 124   12/1998  (DE) .

\* cited by examiner

*Primary Examiner*—Jessica Han
(74) *Attorney, Agent, or Firm*—Carlos S. Bessone

(57) ABSTRACT

The invention relates to a half-bridge inverter including a first and a second input terminal (E, N), which form an input of the inverter, a first and a second output terminal (B, A), which form an output of the inverter, a series circuit having a first and a second coupling capacitor (C1, C2), which series circuit is connected in parallel with the input and forms the passive bridge path, the midpoint of the series circuit made up of the first and the second coupling capacitor (C1, C2) being connected to the first output terminal (B), a series circuit having a first and a second switch (S1, S2), which series circuit forms the active bridge path and has its midpoint connected to the second output terminal (A), where a storage capacitor (C3) is arranged in parallel with the active bridge path, and the first coupling capacitor (C1) is connected to the storage capacitor (C3) via a first inductor (L1), and the second coupling capacitor (C2) is connected to the storage capacitor (C3) via a second inductor (L2).

9 Claims, 2 Drawing Sheets

HALF-BRIDGE INVERTER

The present invention relates to a half-bridge inverter in accordance with the preamble to claim 1.

Figure 1:
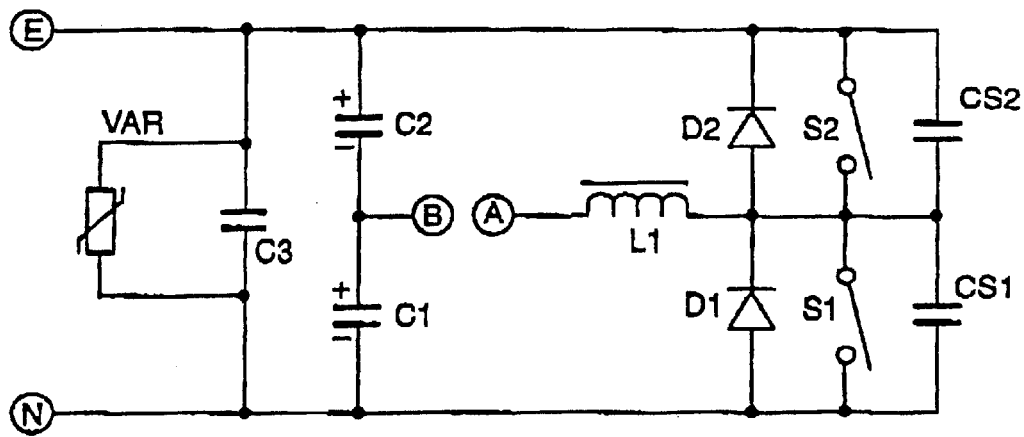

Such a half-bridge inverter known from the prior art (see DE-A 197 22 124) is shown in FIG. 1. A first and a second input terminal E, N form an input, which has a storage capacitor C3 connected in parallel with it. Connected in parallel with the storage capacitor C3 is, on the one hand, a varistor, i.e. a nonlinear resistor, as a surge arrester, which ensures the necessary surge strength in practice, and also the series circuit comprising a first and a second coupling capacitor C1, C2, the midpoint of said series circuit being connected to the first output terminal B of the half-bridge inverter. In this arrangement, the coupling capacitors C1, C2 form the passive bridge path of the half-bridge inverter. The active bridge path of the half-bridge inverter, comprising a first switch S1 and a second switch S2, is connected by its midpoint to the second output terminal A of the half-bridge inverter via an inductor L1, the inductor L1 acting as a polarity-reversal inductor. Connected in parallel with the switches S1 and S2, which are operated in push-pull mode, are a respective freewheeling diode D1, D2 and a respective polarity-reversal capacitor CS1, CS2.

The first disadvantage of the half-bridge inverter shown in FIG. 1 is that, although the alternating current flowing through C3 is filtered by C3, this is not sufficient in practice, with the result that unwanted perturbations are produced at the input E, N. For the application instance where the circuit is designed to provide a high-frequency AC voltage on the terminals B, A, problems arise with regard to radio interference suppression. In addition, the inductor L1 carries both the current load and the magnetization load. This means that the inductor L1 needs to have large dimensions, which results in an undesirably high space requirement.

The object of the present invention is therefore to eliminate these disadvantages, and in particular to provide a half-bridge inverter which can be produced with a relatively small design.

This object is achieved by the disclosure of claim 1.

The half-bridge inverter according to the invention has the advantage that the current load and magnetization load is split between two inductors. The current load on each inductor L1, L2 is therefore half that of the current load on the inductor L1 shown in FIG. 1. The copper losses are thus now a quarter. This allows relatively small components to be used for production and thus reduces the space requirement on a circuit board. Particularly for relatively high powers, production is therefore greatly simplified. In the case of the subject matter of the invention, the storage capacitor C3 is advantageously no longer arranged between the input terminals E, N, but instead is virtually at the other end of the circuit. Assuming that the half-bridge inverter has been designed for high frequency, the high-frequency charge reversal operations are thus as far away as possible from the input terminals E, N, so that the perturbations of the charge reversal operations in C3 have much less of an influence on the input E, N than is the case in the prior art. With particular advantage, the position of the inductors L1, L2 between C3 and the passive half-bridge path comprising the coupling capacitors C1, C2 increases the filter order by two orders, as seen from the input E, N. This results in a significant improvement in radio interference suppression and also in an increase in the surge strength, provided that a surge arrester is connected in parallel with C3. The filter to be provided in a preliminary stage to the left of the input E, N in FIG. 2 can therefore be of simpler design.

In addition, it should be pointed out that the arrangement shown in FIG. 1—as seen from the input terminals E, N—has only a first-order filter, since all the capacitors and the surge arrester VAR connected in parallel with the storage capacitor C3 are connected in parallel.

Provision may be made for the first switch to have a first freewheeling diode connected in parallel with it and for the second switch to have a second freewheeling diode connected in parallel with it. In addition, provision may be made for a first polarity-reversal capacitor to be arranged in parallel with the first switch and/or for a second polarity-reversal capacitor to be arranged in parallel with the second switch.

The optional surge arrester VAR may be in the form of a nonlinear resistor, in particular in the form of a varistor.

With particular advantage, the capacitance value of the first coupling capacitor can be essentially the same as the capacitance value of the second coupling capacitor. The capacitance value of the storage capacitor, which in the half-bridge inverter according to the invention acts as a back-up capacitor for the active bridge path, is preferably twice the capacitance value of the first and/or of the second coupling capacitor.

In one particularly advantageous embodiment, the first inductor is coupled to the second inductor. This enables not just one variant to be produced, in which the first and second inductors are wound on a single core, but rather the coupling can also be designed to be such that the principal inductances of the first and second inductors cause the input current to be smoothed, and that the leakage inductances of the first and second inductors act as a polarity-reversal inductance.

Further advantageous refinements of the invention can be found in the dependent claims.

Figure 2A:
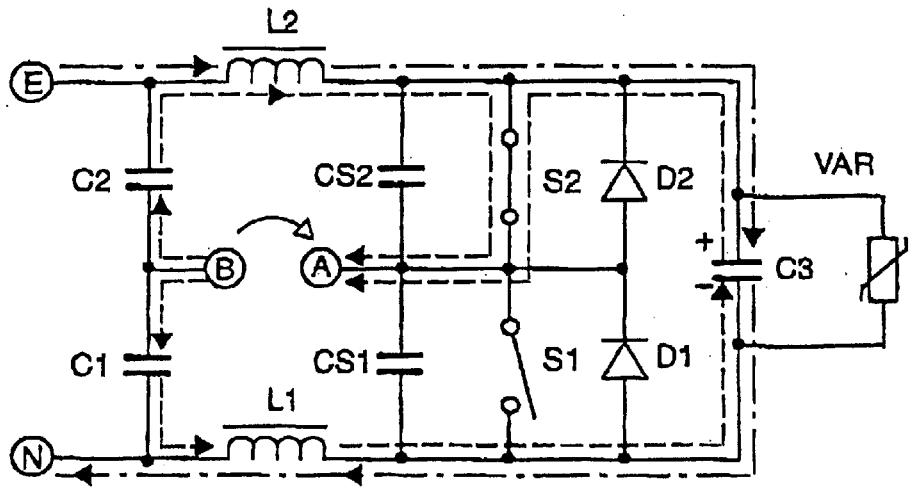
Figure 2B:
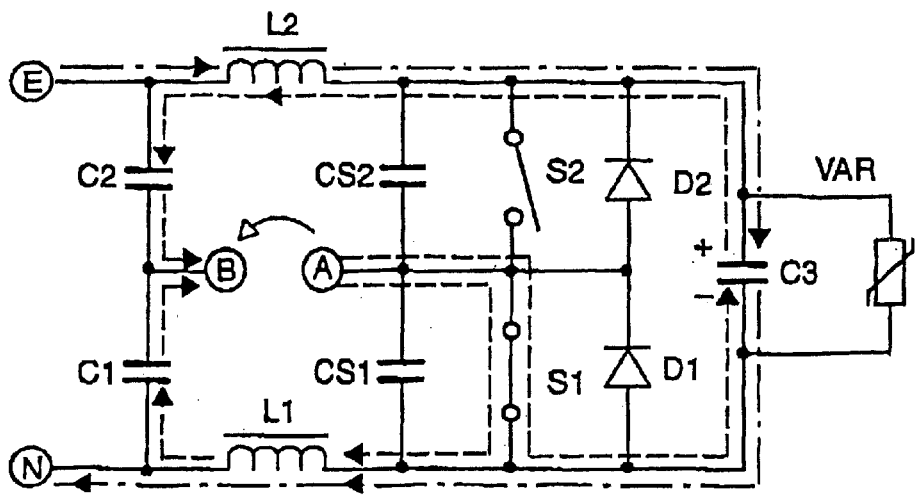
Figure 3A:
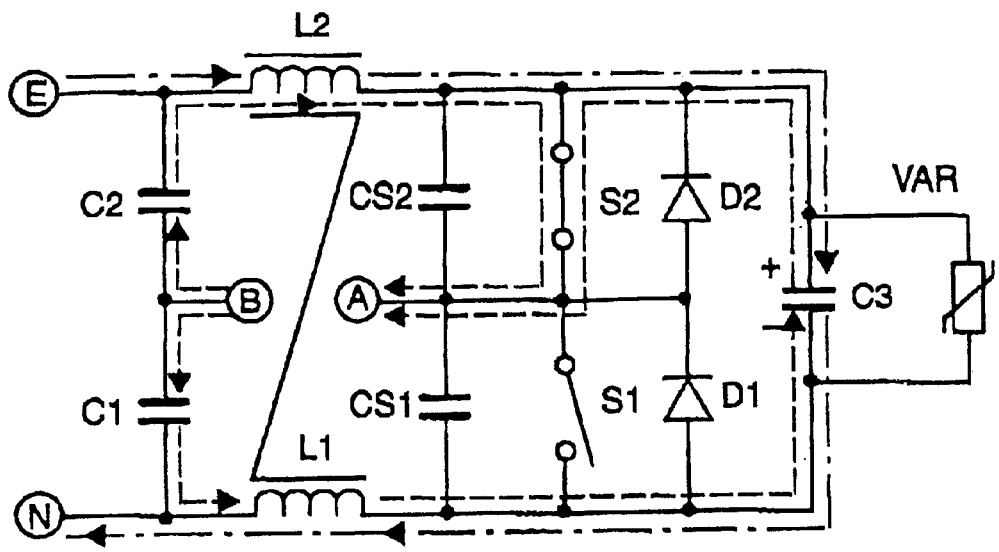
Figure 3B:
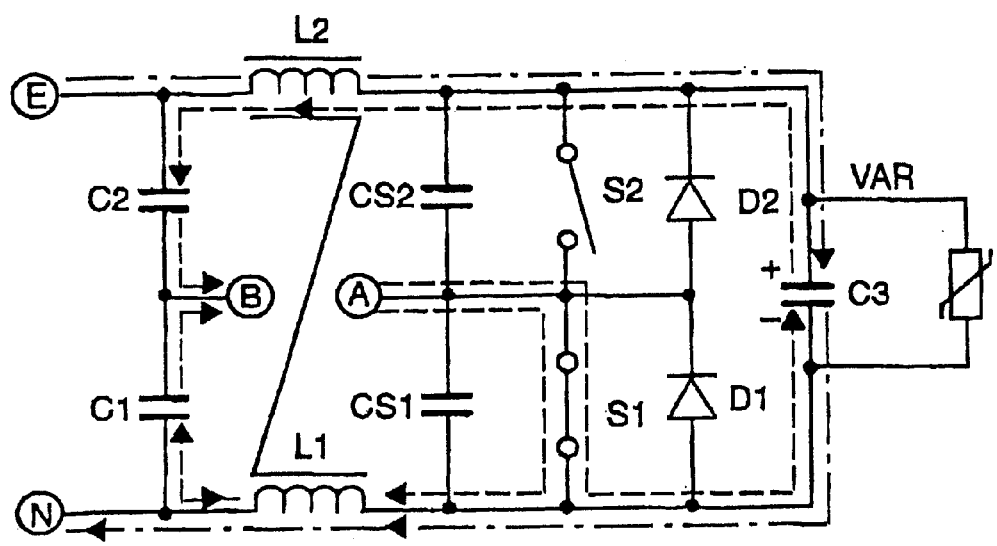

Illustrative embodiments of the half-bridge inverter according to the invention are described in more detail below with reference to the appended drawings, in which:

FIG. 1 shows a half-bridge inverter known from the prior art;

FIGS. 2a an 2b show a half-bridge inverter according to the invention, where dash-dot lines show the course of the direct current and dashed lines show the course of the AC components. Whereas FIG. 2a shows the courses of direct current and alternating current when the switch S2 is closed, FIG. 2b shows these courses when the switch S1 is closed;

FIGS. 3a and 3b show an embodiment having coupled inductors L1, L2, with FIG. 3a corresponding to FIG. 2a and FIG. 3b corresponding to FIG. 2b in terms of the positions of the switches S1 and S2.

Unless indicated otherwise below, identical reference symbols in the various figures denote identical components. FIG. 2a shows a first embodiment of a half-bridge inverter according to the invention, where the passive bridge path formed by the coupling capacitors C1, C2 is arranged in parallel with the input terminals E, N. The midpoint of the passive bridge path is connected to the output terminal B. The active bridge path comprises two switches S1, S2 connected in series, their midpoint being connected to the second output terminal A. Arranged in parallel with each switch is a respective freewheeling diode D1, D2 and a respective polarity-reversal capacitor CS1, CS2. A storage capacitor C3 is connected in parallel with the active bridge path. In addition, an optional surge arrester VAR is shown in FIG. 2a. The coupling capacitor C2 is connected to the switch S2 via an inductor L2, while the coupling capacitor C1 is connected to the switch S1 via an inductor L1. Dashdot lines show the course of the direct current from the input terminal E via the inductor L2, the storage capacitor C3 (for these deliberations, the resistance of the surge arrester can be assumed to be infinite) and the inductor L1 to the second input terminal N. Dashed lines show the courses of the two AC components, with the switch S2 being closed in FIG. 2a: a first AC component flows from the output terminal B through the coupling capacitor C2 via the inductor L2 through the switch S2 to the second output terminal A. The second AC component flows from the output terminal B via the coupling capacitor C1, through the inductor L1, the storage capacitor C3 and the closed switch S2 to the second output terminal A.

FIG. 2b shows the circumstances when the switch S1 is closed. As compared with FIG. 2a, the course of the direct current is unchanged. As regards the AC components, a first one flows from the output terminal A through the switch S1, through the inductor L1, through the coupling capacitor C1 to the output terminal B, while a second component flows from the output terminal A, through the switch S1, the storage capacitor C3, the inductor L2 and the coupling capacitor C2 to the output terminal B. From the current balance at C3, it follows that the storage capacitor is charged by the direct current, while the respective AC component discharges the storage capacitor C3.

In series with the output terminals B, A, the parallel circuit comprising the inductors L1, L2 acts as a polarity-reversal inductance. The loading is thus distributed between the two inductors L1 and L2. The inductors L1, L2, acting in series with the input terminals E, N, cause the input current to be effectively smoothed. In contrast to this, in the case of the half-bridge inverter shown in FIG. 1, AC components are merely filtered out by the capacitor C3.

FIGS. 3a and 3b show a further embodiment of the half-bridge inverter according to the invention. FIG. 3a shows the courses of the direct current and alternating current when the switch S2 is closed, and FIG. 3b shows them when the switch S1 is closed, these switches corresponding to those in FIGS. 2a and 2b. In contrast to the embodiments shown in FIG. 2a and FIG. 2b, the two inductors L1, L2 shown in FIG. 3a and FIG. 3b are coupled to one another. This significantly amplifies the smoothing effect on the input current. The principal inductances of the two inductors L1, L2 cause the input current to be smoothed, while the leakage inductances of the two inductors L1, L2 act as a polarity-reversal inductance. It is possible to have an implementation in which the two inductors L1, L2 are wound on a single core.

In contrast to the half-bridge inverter shown in FIG. 1, the filter order for the half-bridge inverters according to the invention is increased by two orders—as seen from the input E, N. This results in a significant improvement in radio interference suppression and also in an increase in the surge strength, provided that a surge arrester VAR is connected in parallel with the storage capacitor C3.

What is claimed is:
1. A half-bridge inverter comprising:
 a first and a second input terminal (E, N), which form an input of the inverter,
 a first and a second output terminal (B, A), which form an output of the inverter,
 a series circuit comprising a first and a second coupling capacitor (C1, C2), which series circuit is connected in parallel with the input and forms the passive bridge path, the midpoint of the series circuit made up of the first and the second coupling capacitor (C1, C2) being connected to the first output terminal (B),
 a series circuit comprising a first and a second switch (S1, S2), which series circuit forms the active bridge path and has its midpoint connected to the second output terminal (A),
  wherein a storage capacitor (C3) is arranged in parallel with the active bridge path, and the first coupling capacitor (C1) is connected to the storage capacitor (C3) via a first inductor (L1), and the second coupling capacitor (C2) is connected to the storage capacitor (C3) via a second inductor (L2).
2. The half-bridge inverter as claimed in claim 1, wherein the first switch (S1) has a first freewheeling diode (D1) connected in parallel with it, and the second switch has a second freewheeling diode (D2) connected in parallel with it.
3. The half-bridge inverter as claimed in claim 1, wherein a first polarity-reversal capacitor (CS1) is arranged in parallel with the first switch (S1) and/or a second polarity-reversal capacitor (CS2) is arranged in parallel with the second switch (S2).
4. The half-bridge inverter as claimed in claim 1, wherein the storage capacitor (C3) has a nonlinear resistor (VAR) connected in parallel with it as a surge arrester.
5. The half-bridge inverter as claimed in claim 1, wherein the capacitance value of the first coupling capacitor (C1) is essentially the same as the capacitance value of the second coupling capacitor (C2).
6. The half-bridge inverter as claimed in claim 1, wherein the capacitance value of the storage capacitor (C3) is essentially approximately twice the capacitance value of the first and/or the second coupling capacitor (C1, C2).
7. The half-bridge inverter as claimed in claim 1, wherein the first inductor (L1) is coupled to the second inductor (L2).
8. The half-bridge inverter as claimed in claim 7, wherein the first and second inductors (L1, L2) are wound on a single core.
9. The half-bridge inverter as claimed in claim 7, wherein the coupling is such that the principal inductances of the first and second inductors (L1, L2) cause the input current to be smoothed, and that the leakage inductances of the first and second inductors (L1, L2) act as a polarity-reversal inductance.

* * * * *